5 Sheets—Sheet 1.
S. S. TURNER,
Assignor by Mesne Assignments to the AMERICAN STRAW SEWING-MACHINE CO.
SEWING-MACHINE.
No. 7,459. Reissued Jan. 9, 1877.
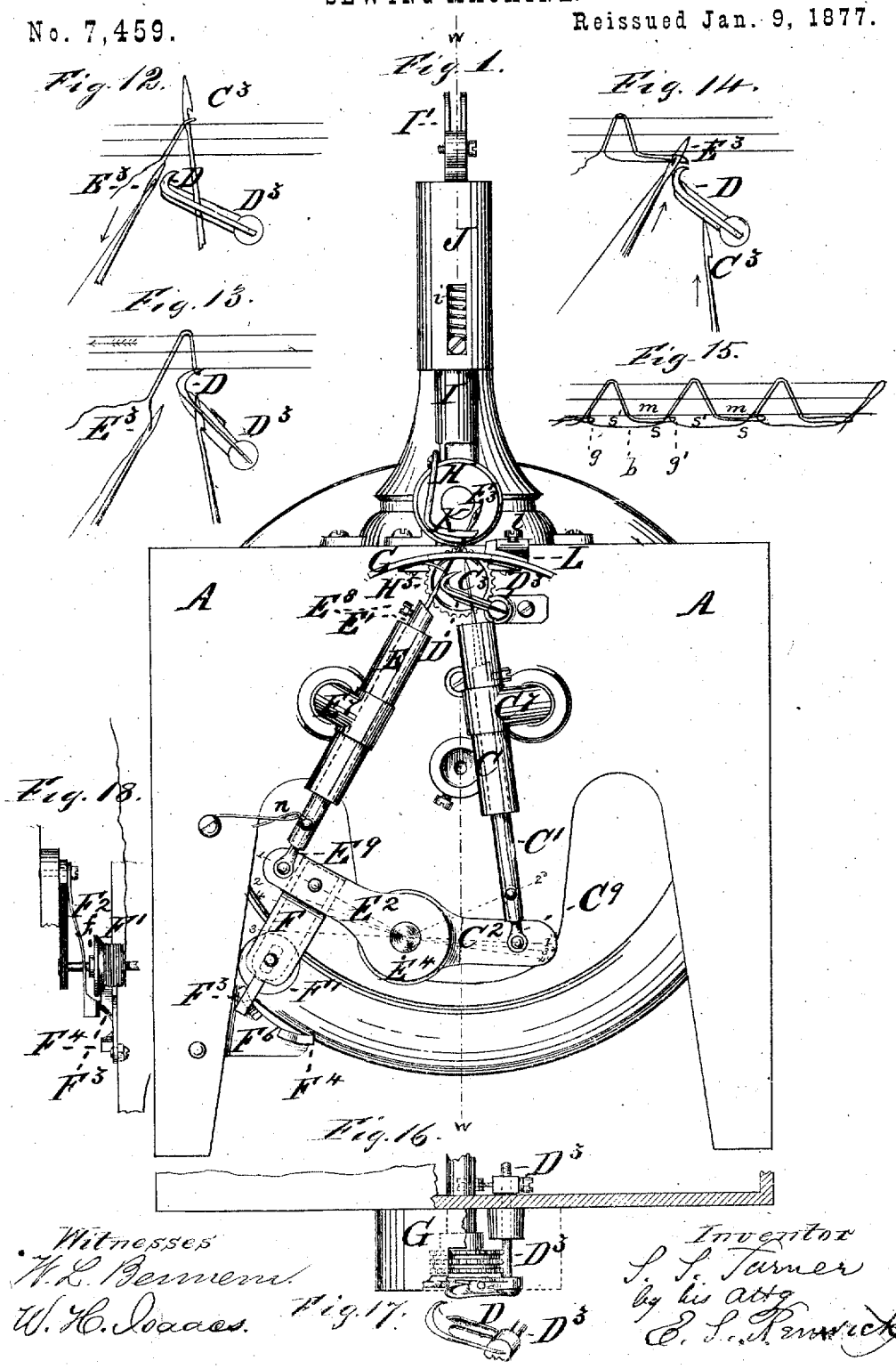
Witnesses
W. L. Bennett
W. H. Isaacs.
Inventor
S. S. Turner
by his atty
E. S. Renwick 5 Sheets—Sheet 2.
S. S. TURNER,
Assignor by Mesne Assignments to the AMERICAN STRAW SEWING-MACHINE CO.
SEWING-MACHINE.
No. 7,459. Reissued Jan. 9, 1877.
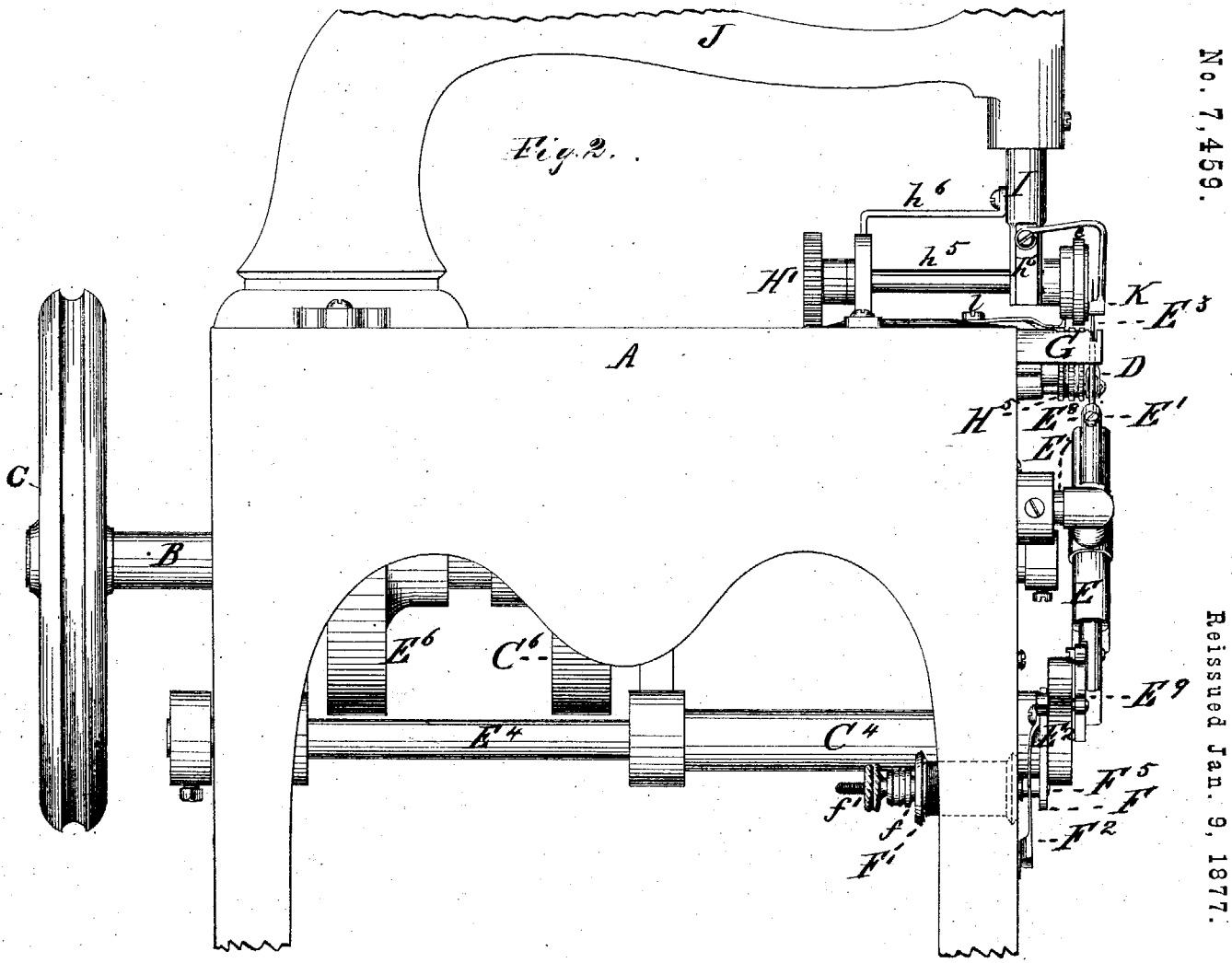
Witnesses
W. L. Bennett.
W. H. Loades.
Inventor
S. S. Turner
by his atty
E. S. Renwick 5 Sheets—Sheet 3.
S. S. TURNER,
Assignor by Mesne Assignments to the AMERICAN STRAW SEWING-MACHINE CO.
SEWING-MACHINE.
No. 7,459. Reissued Jan. 9, 1877.
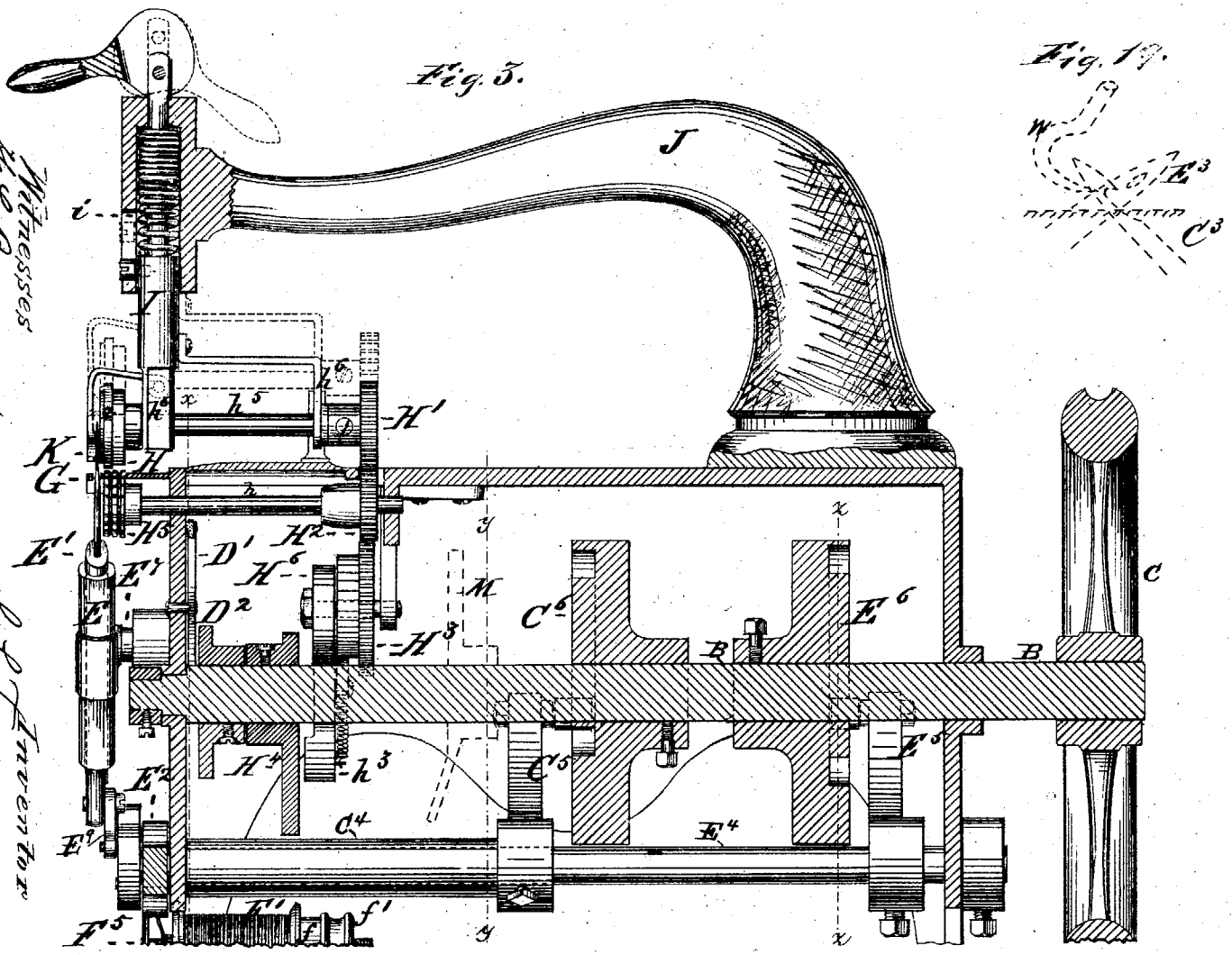
Witnesses
H. L. Bennett.
W. H. Isaacs.
Inventor
S. S. Turner
by his Atty 5 Sheets—Sheet 4.
S. S. TURNER,
Assignor by Mesne Assignments to the AMERICAN STRAW SEWING-MACHINE CO.
SEWING-MACHINE.
No. 7,459. Reissued Jan. 9, 1877.
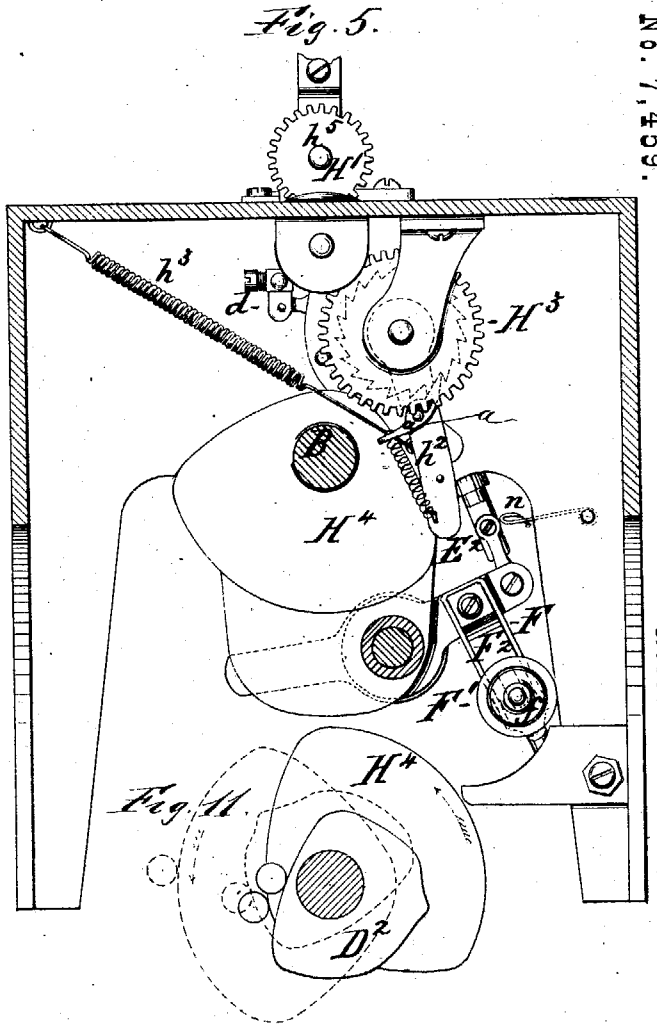
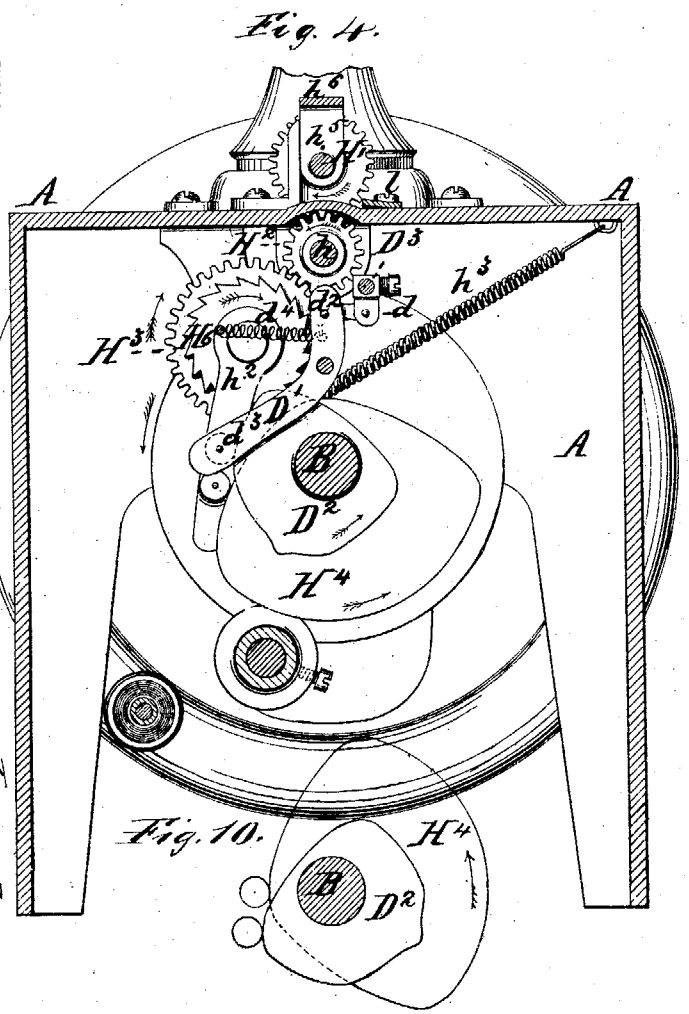
Witnesses
H. L. Bennett.
W. H. Isaacs
Inventor
S. S. Turner
by his Atty
E. S. Renwick

S. S. TURNER,
Assignor by Mesne Assignments to the AMERICAN STRAW SEWING-MACHINE CO.
SEWING-MACHINE.
No. 7,459. Reissued Jan. 9, 1877.
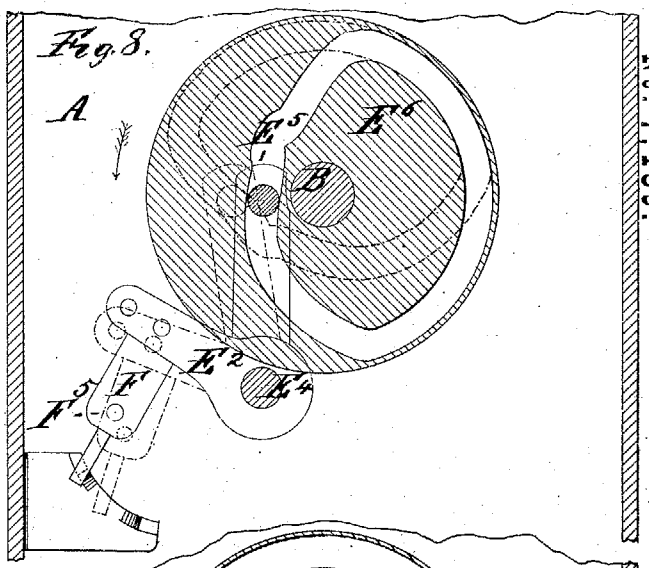
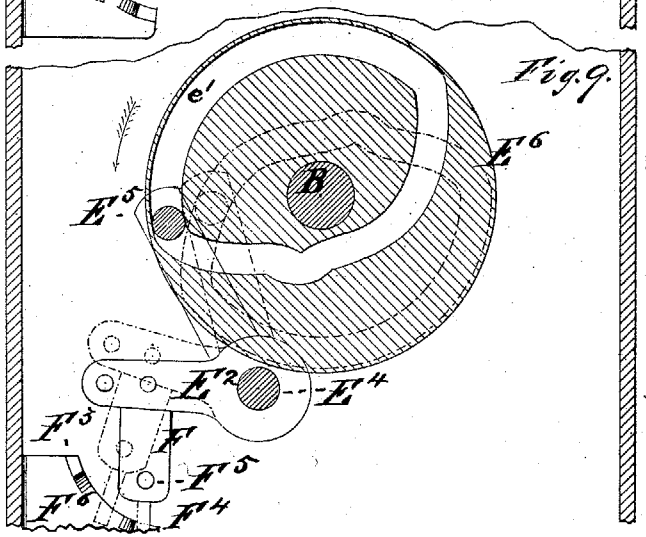
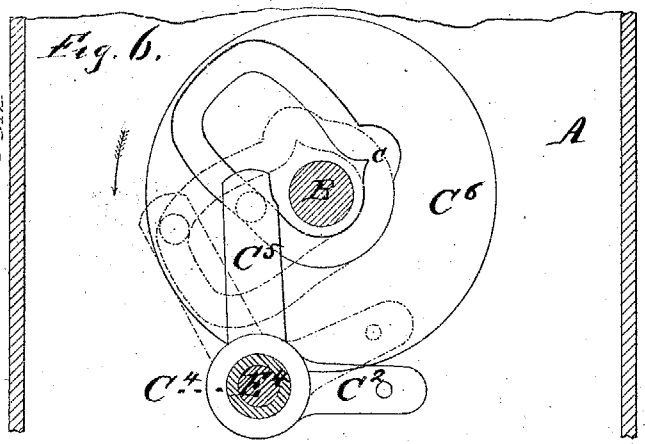
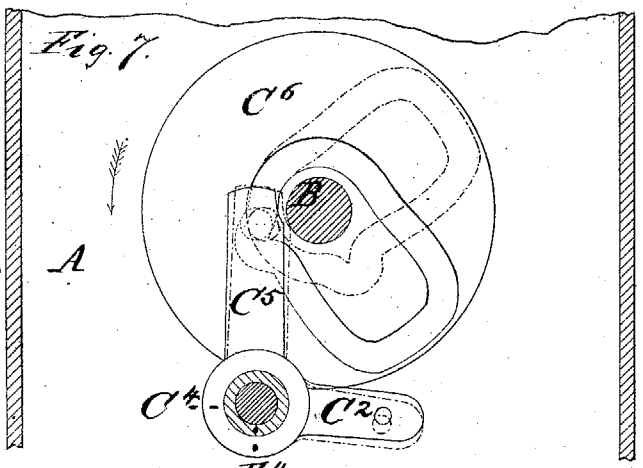
Witnesses
H. L. Bennett
W. H. Isaacs.
Inventor
S. S. Turner
by his atty
C. S. Renwick

UNITED STATES PATENT OFFICE.

SIDNEY S. TURNER, OF WESTBOROUGH, MASSACHUSETTS, ASSIGNOR, BY MESNE ASSIGNMENTS, TO THE AMERICAN STRAW SEWING MACHINE COMPANY.

IMPROVEMENT IN SEWING-MACHINES.

Specification forming part of Letters Patent No. 94,046, dated August 24, 1869; reissue No. 7,459, dated January 9, 1877; application filed June 24, 1876.

*To all whom it may concern:*

Be it known that I, SIDNEY S. TURNER, of Westborough, in the county of Worcester and State of Massachusetts, have made an invention of certain new and useful Improvements in Sewing-Machines for which Letters Patent of the United States were granted to me and Willard Comey the 24th day of August, A. D. 1869; and that the following is a full, clear, and exact description of the said invention.

The principal object of my invention is to enable straw goods to be sewed with rapidity.

My invention consists of certain combinations of mechanical instrumentalities, and of a peculiar chain-stitch, suitable particularly for sewing straw goods.

The principal mechanical instrumentalities of which my combinations are composed are: The main frame of the machine, which supports the driving-shaft and the other movable parts; a table-plate, upon which the material to be sewed is supported; a rest or foot, to hold the material against said table-plate; a reciprocating eye-pointed needle, for perforating the material and passing loops of thread through it; a reciprocating perforating-hook, for perforating the material, seizing the loops of needle-thread, and drawing them through the material; an adjustable sewing-needle guide, which enables the needle to be set to perforate the material at different points; an adjustable perforating-hook guide, which enables the perforating-hook to be set to perforate the material at different points; a loop-holder, to receive the loop of thread from the perforating-hook, and to present it to the needle; guides or gages to determine the position of the material relatively to the sewing and feeding instrumentalities; a feeding implement, for causing the material to progress past the sewing instrumentalities; a thread-tension, to apply the requisite tension to the thread; means of relaxing the thread-tension, when necessary; a looper, for holding the needle-thread for the operation of the perforating-hook.

The combinations of said instrumentalities which, with a new kind of chain-stitch, constitute the said invention, are set forth in detail at the close of this schedule. In order that they may be fully understood, I have represented in the accompanying drawings, and will proceed to describe, a sewing-machine in which I have embodied them. The drawings represent the mechanism in several of the principal positions which the parts assume in operation.

Figure 1 is a front-elevation of the machine. Fig. 2 is a side elevation of the same; Fig. 3, a longitudinal section in the line *w w* of Fig. 1. Fig. 4 is a transverse section (looking toward the rear of the machine) at the line *x x* of Fig. 3, and showing more particularly the mechanism for operating the loop-holder and feeding instruments. Fig. 5 is a similar section, looking toward the front of the machine, in the line *y y* of Fig. 3, showing the opposite side of the mechanism represented in Fig. 4. Fig. 6 is a similar section (looking toward the rear of the machine) at the line *y y*, Fig. 3 and showing the cam mechanism for operating the perforating-hook by full lines in one position, and by dotted lines in another position. Fig. 7 is a view of the same cam mechanism in two other positions, as shown by full lines and by dotted lines. Fig. 8 is a transverse section (looking toward the front of the machine) at the line *z z* of Fig. 3, showing the machine for operating the needle, and also the thread-tension in two different positions. Fig. 9 is a similar view of the same mechanism in two other positions. Fig. 10 is a view of the cams for operating the loop-holder and feed mechanism; Fig. 11, a similar view of the same cams in two other positions. Figs. 12, 13, and 14 are views upon an enlarged scale, showing the hook, needle, and loop-holder in different positions. Fig. 15 is a view, upon an enlarged scale, showing the stitch formed by the above-mentioned devices when passing through the said positions and movements, as hereinafter more fully described.

In order that the character of the stitch may be seen the thread is represented as loose.

Fig. 16 is a plan of loop-holder and feed-wheel, showing their relative horizontal positions. Fig. 17 is a perspective view of the loop-holder detached. Fig. 18 is a view in elevation of parts of the tension mechanism. Fig. 19 is a view of the looper, needle, and perforating-hook.

The frame A of said machine has the form of a table, to one end of which the sewing mechanism is applied. The various moving instrumentalities which operate in sewing are operated by means of cams $E^6$ $C^6$ $H^4$ $D^2$ M, which cause them to move at the proper times, and to the requisite extents, and which are all secured to a revolving shaft, B. Motion is imparted to this shaft by means of a belt, which, in this instance, is applied to the grooved rim of a pulley fly-wheel, C, secured to the said driving-shaft. The instrumentalities which operate upon the material to be sewed are arranged at the front end of the frame A, and the said material is supported upon a table-plate, G, which is secured to said frame, and is, in this instance, curved so as to facilitate the sewing of the curved crowns of straw hats.

The table-plate G is slotted, to permit the needle $E^3$ and the perforating-hook $C^3$ to move through it. The needle $E^3$ is secured to a reciprocating bar or stock, $E^1$, which is arranged to slide in a needle-guide, E, that is constructed with a trunnion, $E^7$, and this trunnion is secured in a hole in the front of the frame A, so that the guide is adjustable, and may be swung or partially turned on the axis of said trunnion as a center to vary the angle at which the needle enters the material, and consequently to vary the position at which it perforates the upper surface of the material. The needle-guide is slotted at its upper end to permit the head of the clamp-screw $E^8$, which holds the needle, to play; and the lower end of the needle-bar is connected by a link, $E^9$, with an arm, $E^2$, which is secured to a rock-shaft, $E^4$. The rock-shaft is fitted with a second arm, $E^5$, having secured to it a friction-roller, which traverses the cam-groove of the cam $E^6$, so that this cam operates the needle through the intervention of the arms $E^5$ $E^2$, the rock-shaft $E^4$, the link $E^9$, and the needle-bar $E^1$.

The perforating-hook $C^3$ is secured to a bar, $C^1$, similar to the needle-bar, and constructed to slide in an adjustable swinging guide, C, constructed with a trunnion, $C^7$, similar to the swinging guide for the needle. The bar $C^1$ is connected, by a link, $C^9$, with an arm, $C^2$, secured to a tubular rock-shaft, $C^4$, which is arranged to rock upon the needle rock-shaft $E^4$, and is fitted at its inner end with a second arm, $C^5$. This arm $C^5$ is fitted with a friction-wheel, which traverses the groove of the cam $C^6$, so that this cam imparts motion to the perforating-hook through the intervention of the arms $C^5$ $C^2$, the rock-shaft $C^4$, the link $C^9$, and the bar $C^1$. The perforating-hook and the needle are arranged to operate at an angle with each other, so that their tracks cross; and as their guides may be swung or partially turned, the place where the tracks cross may be either within the thickness of the material or more or less above it, and consequently the appearance of the stitch at the upper side of the material may be made more or less prominent, as desired, by varying the relative positions of the needle and hook guides.

The thread for sewing is contained on a spool, $F^1$, which is applied to a stem, $F^5$. This stem is secured to a bracket, F, projecting from the needle-arm $E^2$, so that the spool in this instance moves with the needle, and consequently the necessity of employing a separate take-up is dispensed with.

In order that the thread may be subjected to the requisite tension, two conical thimbles, *f f*, are applied to the stem $F^5$, one for each end of the spool. A tension-spring, $F^2$, is applied to the outer side of one of these thimbles, and a screw-nut, *f′*, is employed to force the said thimbles and the spool between them toward the said spring, so as to clamp the spool between the thimbles, and to compress the spring more or less for the purpose of varying the tension.

The end of the tension-spring projects beyond the spool, and vibrates within the range of two stationary cam-inclines, $F^3$ $F^4$, so arranged that whenever the end of the tension-spring is brought in contact with one of them the pressure of the spring upon the thimble is relaxed, to permit the spool to turn and the thread to render freely.

The cam-inclines $F^3$ $F^4$ are secured to a cam-plate, $F^6$, which is fastened to the frame A, and the tension-spring is slotted and passed over the stem $F^5$, so that the latter prevents it from being displaced when it is borne against the cam-inclines.

In order to hold the material against the perforating pressure of the needle and perforating-hook, a presser-foot, K, and a presser-wheel, H, are provided. Both of these are secured to the lower end of a piston, I, which is arranged to slide toward and from the table-plate G in a socket in an arm, J, that projects above and is secured to the main frame. A spring, *i*, is provided to cause this presser-foot and presser-wheel to press upon the material with a yielding pressure, because, as the table-plate G in this machine is fixed to the main frame, the presser foot and wheel must move to adapt themselves to variations in the thickness of the material. The upper end of the rod of the piston I is fitted with a cam-lever, I′, by which the piston and pressing instruments may be raised to permit the material to be applied to or removed from the table-plate.

In the operation of the machine the loop of thread passed through the material by the needle is entered by the perforating-hook, and is seized and drawn downward through the material by the barb of said hook, after which the loop is entered by the needle, when the latter rises to pass a new loop through the material.

In order to hold the loop for being thus entered by the needle, the loop-holder D is provided. This loop-holder has the form of a hook, with a wedge-formed end, and is secured to a rock-shaft, $D^3$. The rock-shaft $D^3$ is fitted with an arm, $d$, which is connected by a link with the shorter arm $d^2$ of a vibrating lever, $D^1$, whose longer arm $d^3$ is provided with a friction-wheel, that is borne against the rim of a cam, $D^2$, by means of a spring, $d^4$, so that the cam causes the loop-holder to move in one direction, and the spring causes it to move in the opposite direction.

In order to move the material through the machine, a rough-surfaced or toothed feed-wheel, $H^5$, is provided. This feed-wheel has a toothed periphery, and is secured to the front end of a shaft, $h$, whose rear end is fitted with a cog-wheel, $H^2$, which engages with a second cog-wheel, $H^3$. The latter is arranged to revolve upon a stud, and has a ratchet-wheel, $H^6$, secured to it, which is operated by a pawl, $a$, that is connected with a vibrating arm, $h^2$. This arm is fitted with a friction-wheel, which is borne against the rim of a cam, $H^4$, by means of a spring, $h^3$, so that the cam causes the pawl to turn the ratchet-wheel $H^6$ and cog-wheel $H^3$, and thus turn the feed-wheel $H^5$, while the spring $h^3$ causes the pawl to move backward over the ratchet-wheel, preliminary to a forward movement. The cog-wheel $H^3$ is of larger diameter than the cog-wheel $H^2$ of the feed-shaft $h$, so that the feed-wheel is caused to move a large angular distance for each movement of the pawl $a$, and thus make a coarse feed, as is expedient when sewing straw goods. The feed-wheel $H^5$ protrudes through an opening in the table-plate, and acts upon the under side of the material. In order to sustain the material against the pressure of the feed the smooth-surfaced presser-wheel H is arranged above the feed-wheel, being secured to a shaft, $h^5$, that is constructed to turn in bearings $h^6$, that are made fast to the piston I of the presser-foot; and, in order to avoid the rubbing of the surface of the material, and to insure the feeding, the shaft of the presser-wheel H is fitted with a cog-wheel, $H^1$, whose teeth engage with those of the wheel $H^2$, secured to the feed-wheel shaft $h$, so that the presser-wheel turns simultaneously with the feed-wheel, and thus rolls upon the surface of the material.

The position of the straw braid relatively to the feed-wheel and the sewing instrumentalities is determined by a gage, L, which is adjustable, and can be secured in any desired position by means of a clamp-screw, $c$. The position of the work to which the straw braid is to be sewed is determined by the outer face of the presser-wheel H, against which the edge of the work is borne by the operator; and the outer face of said presser-wheel is fitted with a projecting rim, $e$, which forms a species of rabbet, so that the edge of the work is prevented from turning up when borne against the face of the wheel.

In adjusting the machine for use, the swinging guides for the needle and perforating-hook are set at a more or less acute angle with each other, to vary the distance between the points at which they emerge at the upper surface of the material, and thus vary the length of the stitch at the upper side of the work. If the guides be set so that the tracks of the needle and perforating-hook cross each other below the upper surface of the material, the outer side of the stitch, when made, is embedded in the work.

In some cases I use a looper, W, Fig. 19, operating in connection with the needle and the perforating-hook, to take the loop from the former, and hold it for being entered by the latter. This looper may be operated by a cam, M, represented in dotted lines at Fig. 3.

The thread from the spool is conducted through a thread-guide, $n$, and is applied to the needle-eye. The strand of braid to be sewed is laid upon the table-plate with its inner edge in contact with the gage L, and the other strand of braid, or a sewed portion of the hat, is laid over the first-mentioned strand with its edge in the rabbet of the presser-wheel H. The machine being put in operation, the needle ascends, perforating the material, and carrying the loop of thread through it until the needle reaches its highest position, as seen at Fig. 1, at which time the various members of the machine occupy the positions in which they are respectively represented in Figs. 1, 2, 3, 4, and 5, and in Figs. 6 and 8, in continuous lines. Before the needle reaches its highest position the perforating-hook $C^3$ commences to advance, so that when the needle reaches its highest position the perforating-hook, as seen in Fig. 1, is close to the under surface of the material. During the latter part of the upward movement of the needle the thread-tension has been relaxed by the end of the tension-spring $F^2$ being brought in contact with the cam-incline $F^3$, so that the thread is not under tension when the needle reaches its highest point; hence when the needle is drawn downward by the operation of its cam $E^6$, the friction of the material upon the thread causes the loop in the needle-eye to expand above the surface of the material in the form of a loop, and consequently the continued ascent of the perforating-hook causes it to enter the said loop, and then to proceed upward to its uppermost position.

As soon as the perforating-hook enters the loop sufficiently to secure it, the downward movement of the needle is resumed, and as the movement of the arm $E^2$, for the purpose of retrograding the needle, releases the tension-spring from the cam-incline $F^3$, the thread is drawn down with the needle, and the loop is drawn closely upon the stem of the perforating-hook, as seen at Fig. 12, the needle and perforating-hook cams being then in the positions represented in dotted lines in Figs. 6 and 8. The form of the cam of the perforating-hook is, by preference, made such, as seen at $C^6$, Fig. 6, as to hold the hook stationary for a short period in its uppermost position, while the loop is being drawn tight upon its stem by the descent of the needle.

Subsequently the hook commences to descend, drawing the loop with it, and, as this descent occurs while the tension-spring $F^2$ is brought (by the movement of the needle-arm $E^2$) in contact with the second cam incline $F^4$, the thread is free to be drawn downward by the hook. As the hook descends, the loop-holder D is progressively raised by the operation of its cam $D^2$, so as to be in a position to catch the loop. After the hook has drawn the loop downward through the material sufficiently to be caught by the loop-holder D, the perforating-hook is slightly advanced (by the action of the part of the cam at *c*, Fig. 6) so as to disengage the barb from the loop, and is immediately afterward drawn downward, so as to be out of the way of the advancing point of the loop-holder D, which, entering the loop after its disengagement, catches and holds it.

Up to this period the material has remained at rest, and the pawl *a* has been retrograded, by the action of the cam $H^4$, over the ratchet-wheel $H^6$. The action of the cam $H^4$ now impels the pawl against the adjacent ratchet-tooth, and turning the ratchet and cog wheels $H^6$ $H^3$ $H^2$ causes the feed-wheel $H^5$ to revolve and feed the material the space of a stitch. During feeding the needle remains stationary in its lowest position, the friction-wheel of its arm $E^5$ being then in the concentric portion *e'*, Fig. 9, of the cam-groove, and as at that time the tension-spring $F^2$ is withheld from acting by the operation of the cam-incline $F^4$ the thread renders from the spool as required, and the loop, which is under the cloth and upon the loop-holder D, is extended in length. Moreover, as the loop-holder is wedge-formed and slightly concave, the loop upon it spreads laterally. When the feed ceases the needle reascends, and passes through the loop upon the loop-holder before it enters the material. As the needle ascends the loop-holder D is depressed by the action of its cam $D^2$, so that it is withdrawn from the loop, and, as the thread-tension spring $F^2$ is removed from the cam-incline $F^4$ by the first portion of the ascent of the needle, the thread is prevented from rendering easily, and the continued ascent of the needle, as it perforates the material, draws the preceding loop tight upon the body of the needle The relative positions of the needle and hook cams $E^6$ $C^6$ at the time the needle reaches its lowest position are represented in continuous lines in Figs. 7 and 9, and the relative positions of the same cams when the needle has ascended about half its stroke are represented in dotted lines in the same figures. Fig. 10 represents the feed and loop holder cams in the positions they occupy when the needle and perforating-hook occupy the positions represented in Fig. 12. Fig. 11 represents the same cams by continuous lines in the positions they occupy when the needle and hook occupy the positions represented at Fig. 13, and the feed commences. The dotted lines in the same figure, 11, represent the positions of the same cams corresponding with the positions of the needle and hook cams, as represented in dotted lines in Figs. 7 and 9.

In the operation of the machine the feed-wheel is moved for each stitch so far as to carry the point *b*, Fig. 15, at which the material is perforated by the perforating-hook, beyond the point *g'*, at which the needle perforates at its next ascent; hence, the loop *m* of thread held by the perforating-hook is extended under the material to the place where the needle enters the material, and the needle-thread *s* also is extended from the last perforation *g* by the needle to the ensuing one *g'*. There are thus three members of thread at the under side of the material, between the hook and needle perforations *b g'*, and one member of thread, *s'*, between the needle and hook perforations *g b* in alternate succession, while the stitches in the material are double and wedge-formed, with the apexes of the wedges near to the upper surface of the material, so that they are hardly perceptible there. The result is a peculiar stitch, which is well adapted to secure straw goods, and can be sewed by machinery with great rapidity.

What I claim as my invention is—

1. The combination, substantially as before set forth, of the table-plate, the reciprocating eye-pointed needle, and the reciprocating perforating-hook.

2. The combination, substantially as before set forth, of the table-plate, the reciprocating eye-pointed needle, the reciprocating perforating-hook, and the adjustable needle-guide.

3. The combination, substantially as before set forth, of the table-plate, the reciprocating eye-pointed needle, the reciprocating perforating-hook, and the adjustable hook-guide.

4. The combination, substantially as before set forth, of the table-plate, the reciprocating eye-pointed needle, the perforating-hook, the thread-tension, and the means, substantially as described, for relaxing that tension intermittently.

5. The combination, substantially as before set forth, of the table-plate, the reciprocating eye-pointed needle, the perforating-hook, and the foot or rest.

6. The combination, substantially as before set forth, of the table-plate, the reciprocating eye-pointed needle, the perforating-hook, and the loop-holder.

7. The combination, substantially as before set forth, of the table-plate, the reciprocating eye-pointed needle, reciprocating perforating-hook, and the gage to determine the position of the material.

8. The combination, substantially as before set forth, of the table-plate, the reciprocating eye-pointed needle, the perforating-hook, the gage, and projecting rim of the presser-wheel.

9. The combination, substantially as before set forth, of the table-plate, the reciprocating eye-pointed needle, the perforating-hook, and the looper at the side of the table-plate opposite that from which the needle and perforating-hook move forward.

10. The method of connecting two pieces of fabric by means of a thread looped substantially as represented and described.

In witness whereof I have hereto set my hand this 23d day of March, A. D. 1876.

SIDNEY S. TURNER.

Witnesses:
JOSIAH CHILDS,
NOAH NASON.